United States Patent
Missoum et al.

(10) Patent No.: US 7,290,503 B2
(45) Date of Patent: Nov. 6, 2007

(54) HIGH EFFICIENCY, WET-BASE, DOWNFIRED MULTI-PASS WATER HEATER

(75) Inventors: Ozzie Missoum, Pike Road, AL (US); Gregory M. Welk, Prattville, AL (US); Qian Zhang, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 158 days.

(21) Appl. No.: 11/350,443

(22) Filed: Feb. 9, 2006

(65) Prior Publication Data

US 2007/0181081 A1    Aug. 9, 2007

(51) Int. Cl.
*F24H 1/14*    (2006.01)
(52) U.S. Cl. ............ 122/18.1; 122/18.3; 122/121
(58) Field of Classification Search ........... 122/17.1, 122/13.01, 14.1, 18.1, 18.3, 15.1, 121, 31.1, 122/31.2; 126/344, 360.1, 360.2
See application file for complete search history.

(56) References Cited

U.S. PATENT DOCUMENTS

| | | | |
|---|---|---|---|
| 240,299 A | 4/1881 | Brazelle | |
| 457,522 A | 8/1891 | Ross | |
| 462,975 A | 11/1891 | Fowler | |
| 1,080,258 A | 12/1913 | Buck | |
| 1,406,044 A | 2/1922 | Lindberg | |
| 1,829,334 A | 10/1931 | Birtch | |
| 1,924,209 A | 8/1933 | Kilgour | |
| 2,832,320 A | 4/1958 | Thome et al. | |
| 3,757,745 A | 9/1973 | Miller | |
| 4,192,260 A | 3/1980 | Ostbo | |
| 4,981,112 A | 1/1991 | Adams et al. | |
| 5,016,577 A * | 5/1991 | Hunt | 122/182.1 |
| 5,022,379 A | 6/1991 | Wilson, Jr. | |
| 5,195,502 A * | 3/1993 | Hanning | 122/18.3 |
| 5,197,415 A * | 3/1993 | Stretch et al. | 122/14.22 |
| 5,253,703 A * | 10/1993 | Master et al. | 165/82 |
| 5,666,943 A | 9/1997 | Adams | |
| 5,699,756 A | 12/1997 | Ross et al. | |
| 6,553,948 B1 | 4/2003 | Luo | |
| 6,612,301 B2 | 9/2003 | Vago | |
| 2005/0172915 A1 | 8/2005 | O'Donnell et al. | |

* cited by examiner

*Primary Examiner*—Gregory A. Wilson
(74) *Attorney, Agent, or Firm*—Haynes and Boone, LLP

(57) ABSTRACT

A fuel-fired water heater has a three-pass condensing type heat exchanger disposed within its tank and having a central vertical first pass flue pipe separated into upper and lower portions by an internal dividing structure. Respectively coupled to the upper and lower first pass flue pipe portions are circumferentially spaced series of vertical second and third pass flue pipes which circumscribe the central flue pipe within the tank. During firing of the water heater, combustion gases from a power burner are sequentially forced downwardly through the upper portion of the first pass flue pipe, upwardly through the second pass flue pipes to an upper plenum external to the tank, and then downwardly through the third pass flue pipes and the lower central pipe portion into a bottom plenum external to the tank for discharge from the water heater.

20 Claims, 3 Drawing Sheets

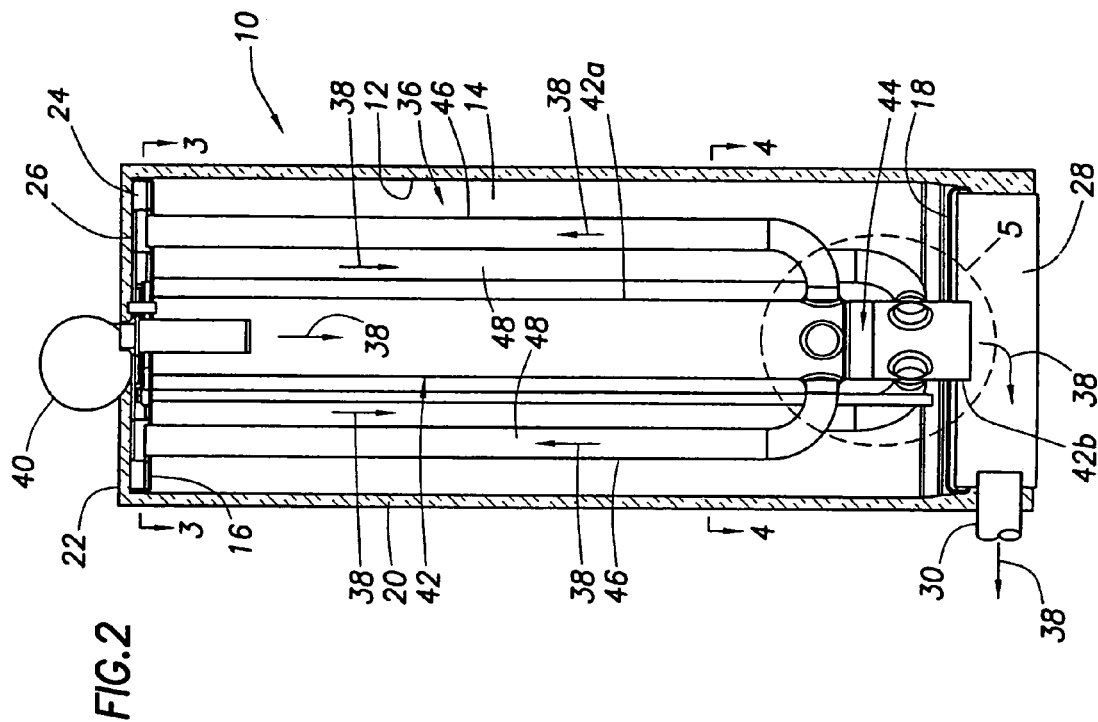
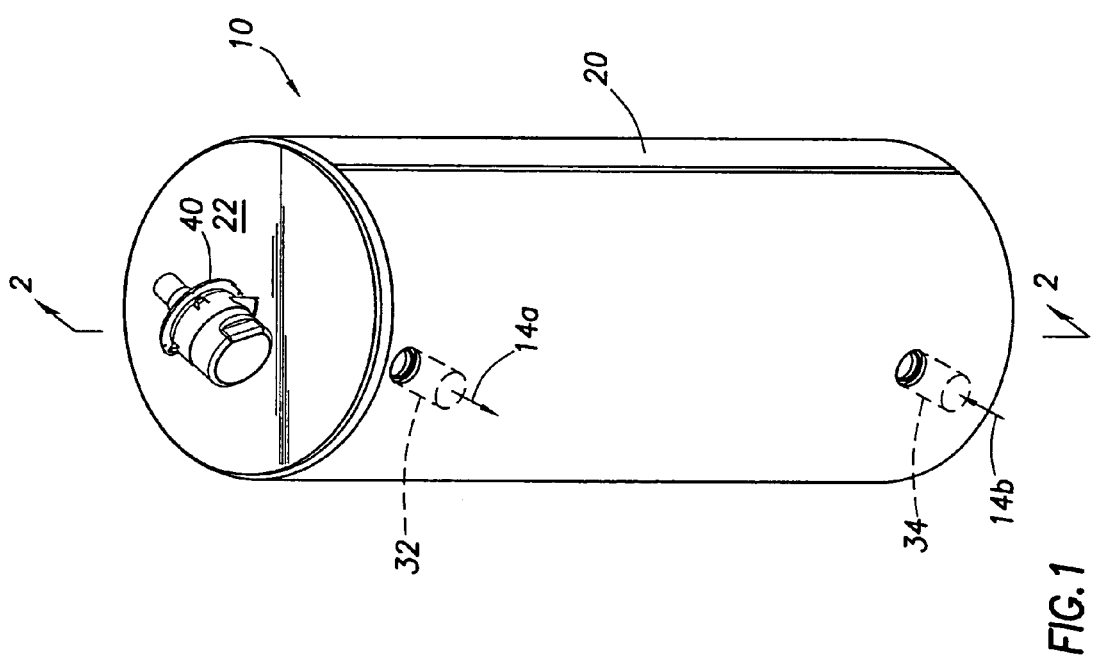

HIGH EFFICIENCY, WET-BASE, DOWNFIRED MULTI-PASS WATER HEATER

BACKGROUND OF THE INVENTION

The present invention generally relates to fuel-fired fluid heating devices and, in a representatively illustrated embodiment thereof, more particularly provides a fuel-fired water heater having a specially designed multi-pass condensing type heat exchanger incorporated therein.

Conventional fuel-fired water heaters are typically of a "single pass", non-condensing configuration, meaning that the hot combustion gases used to heat the tank-stored water are subjected to only a single pass through a heat exchanger structure (usually a vertical flue) within the tank before being discharged from the water heater to, for example, an external vent structure, and that flue gas condensation does not occur to any appreciable degree in the heat exchanger structure within the water heater tank. In this conventional type of fuel-fired water heater, the overall thermal efficiency is typically limited to about 80-85%. Various proposals have been made to provide fuel-fired water heaters with condensing type single-pass heat exchangers (i.e., in which flue gases condense within the heat exchanger). However, previously proposed single-pass condensing type heat exchange structures incorporated in fuel-fired water heaters typically provide the water heaters with thermal efficiencies limited to the 85-90% range.

In an attempt to increase this thermal efficiency to above 95%, multi-pass condensing heat exchangers of varying configurations and types have been proposed for installation within the tank portions of fuel-fired water heaters. While such previously proposed multi-pass condensing type heat exchangers have met this thermal efficiency goal, they have also undesirably presented various problems, limitations and disadvantages. These include increased heat exchanger complexity, higher material and fabricational costs, condensate management problems, increased operational noise, and reduced heat exchanger operational life.

It would thus be desirable to provide a fuel-fired water heater, or other type of fuel-fired fluid heating device, with an improved multi-pass condensing type heat exchanger. It is to this goal that the present invention is primarily directed.

SUMMARY OF THE INVENTION

In carrying out principles of the present invention, in accordance with representatively illustrated embodiments thereof, a fuel-fired water heater is provided with a specially designed three pass condensing type heat exchanger. While the invention is illustratively incorporated in a water heater, it could alternatively utilized to be advantage in a variety of other types of fuel-fired heating appliances, such as boilers, without departing from principles of the present invention.

In representatively illustrated embodiments thereof, the water heater has a tank for holding water to be heated, and first and second spaced apart plenum structures external to the tank. The heat exchanger is disposed within the tank and includes a tubular first pass member, a dividing structure separating the first pass member into a first longitudinal portion and a second longitudinal portion communicating with the interior of the second plenum structure, at least one tubular second pass member having a first end communicating with the interior of the first longitudinal portion of the first pass member and a second end communicating with the interior of the first plenum structure, and at least one tubular third pass member having a first end communicating with the interior of the first plenum structure and a second end communicating with the interior of the second longitudinal portion of said first pass member.

A combustion system is provided which is operative to flow hot combustion gas sequentially through the first longitudinal portion of the first pass member and then into the first plenum structure via the at least one second pass member, from the first plenum structure into the second longitudinal portion of the first pass member via the at least one third pass member, and then into the second plenum structure from he second longitudinal portion of said first pass member.

Illustratively, the water heater has a down-fired configuration, with the first plenum structure being an upper plenum structure, the second plenum structure being a lower plenum structure, and the first, second and third pass members longitudinally extending generally vertically through the interior of the tank. The combustion system includes a power burner operative to flow the hot combustion gas downwardly into the first longitudinal portion of the first pass member.

Preferably, the at least one tubular second pass member is a plurality of tubular second pass members circumferentially spaced outwardly around the tubular first pass member in a parallel relationship therewith, and the at least one tubular third pass member is a plurality of tubular third pass members circumferentially spaced outwardly around the tubular first pass member in a parallel relationship therewith. The second and third pass members are disposed in a generally circular array around the first pass member, with the second pass members being circumferentially interdigitated with the third pass members and the upper plenum structure having an annular configuration.

In representatively illustrated embodiments of the water heater, the dividing structure includes a dividing member press-fitted into the interior of the first pass member. In one embodiment of the dividing structure, the dividing member has a generally cup-shaped configuration with an open side peripheral edge being welded to the interior of the first pass member. In a second embodiment of the dividing structure, a meltable sealant material is placed into the interior of the generally cup-shaped dividing member, the dividing member is press-fitted into the interior of the first pass member, and heat is appropriately applied to the sealant material to melt it within the installed dividing member. In a third embodiment of the dividing structure, a rigid insulating material is placed into the generally cup-shaped dividing member before it is press-fitted into the interior of the first pass member.

BRIEF DESCRIPTION OF THE DRAWINGS

FIG. 1 is a perspective view of a fuel-fired water heater embodying principles of the present invention;

FIG. 2 is a cross-sectional view through the water heater taken generally along line 2-2 of FIG. 1;

DETAILED DESCRIPTION

Figure 4:
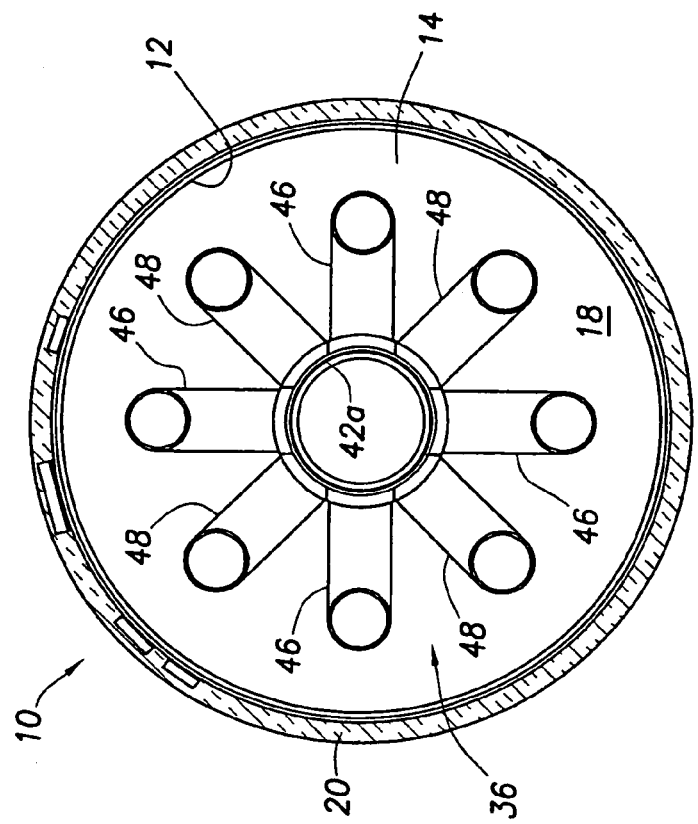
FIG. 4 is an enlarged scale cross-sectional view through the water heater taken generally along line 4-4 of FIG. 2.
Figure 3:
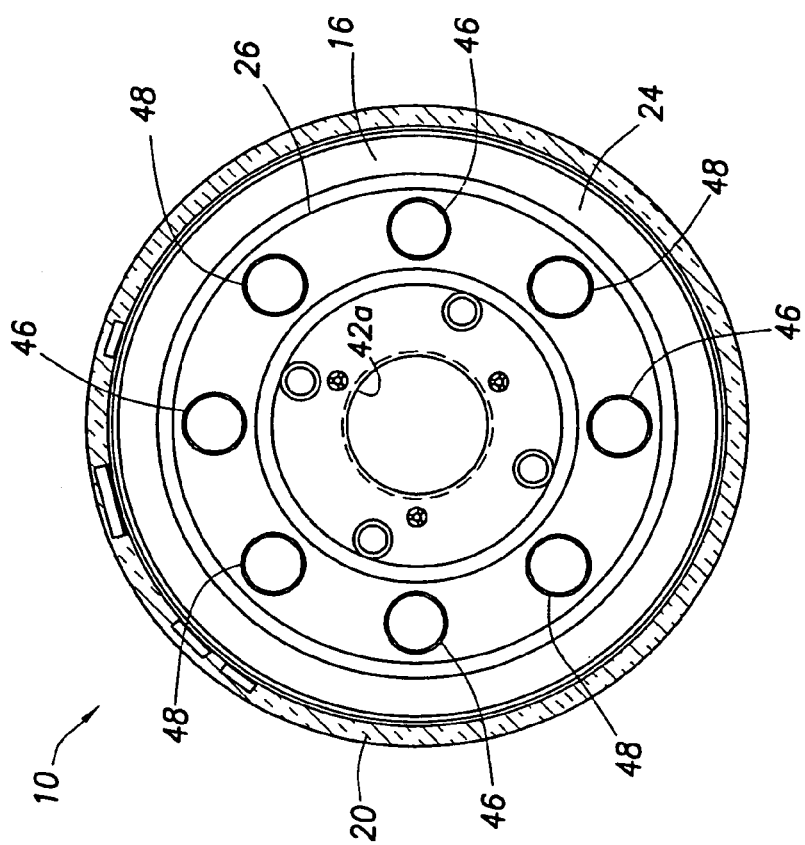
FIG. 3 is an enlarged scale cross-sectional view through the water heater taken generally along line 3-3 of FIG. 2.

Referring initially to FIGS. 1 and 2, the present invention provides a specially designed fuel-fired heating appliance 10 which is representatively a gas-fired water heater but could alternatively be another type of fuel-fired heating apparatus such as, for example, a boiler water heater 10 representatively has a vertically elongated cylindrical configuration and includes a metal tank 12 adapted to receive and store a quantity of water 14 to be heated. Tank 12 has a top end wall 16 and a bottom end wall 18, and is disposed within an insulated jacket structure 20 having a top wall 22 spaced upwardly apart from the top end wall 16 of the tank 12.

An upper end portion of the jacket structure 20 defines a cylindrical interior space 24 above the top end wall 16 of the tank 12, and an annular plenum structure 26 extends along the top side of the tank end wall 16 within the interior space 24. For purposes later described herein, a cylindrical bottom plenum structure 28 extends downwardly from the bottom tank end wall 18, with a vent pipe 30 extending into the bottom plenum 28. During a demand for heated water delivery from the water heater 10, pressurized heated water 14a is withdrawn from the tank 12 via a supply fitting 32 communicated with an upper interior portion of the tank 12, the withdrawn water 14a being replenished with pressurized cold water 14b from a suitable source thereof entering a bottom interior end portion of the tank via an inlet fitting 34.

Turning now to FIGS. 2-5, according to a key aspect of the present invention, the water heater 10 is provided with a specially designed condensing type heat exchanger 36 submerged in the stored water 14. As subsequently described herein, during firing of the water heater 10, hot flue gases 38 from a power fuel burner 40 atop the water heater 10 are forced through the heat exchanger 36 to transfer combustion heat, with a thermal efficiency of 95% or above, to the stored water 14.

The heat exchanger 36 is of a three-pass configuration and includes a central vertical flue pipe 42 connected at its upper end to the outlet of the burner 40 which projects downwardly through the upper tank end wall 16. An open lower end of the central flue pipe 42 sealingly extends downwardly through the bottom tank end wall 18 into the lower plenum 28. Positioned within the central flue pipe 42 upwardly adjacent the bottom tank end wall 18 is an internal dividing structure 44 that separates the interior of the flue pipe 42 into an upper longitudinal portion 42a and a lower longitudinal portion 42b.

Turning now to FIGS. 2-5, circumscribing the central flue pipe 42 (which defines a first pass portion of the heat exchanger 12) is a circumferentially spaced plurality of vertical second pass flue pipes 46. Representatively, there are four second pass flue pipes 46 which are circumferentially offset from one another by ninety degrees. The second pass flue pipes 46 have upper ends sealingly communicated with the interior of the upper plenum 26, and lower ends sealingly communicated with the interior of the upper central flue pipe portion 42a above the dividing structure 44.

Also circumscribing the central flue pipe 42 is a circumferentially spaced plurality of vertical third pass flue pipes 48. Representatively, there are four third pass flue pipes 48 which are circumferentially offset from one another by ninety degrees and from the series of second pass flue pipes 46 by forty five degrees. Illustratively, the second and third pass flue pipes 46,48 are in a circular array as may be best seen in FIGS. 3 and 4, with the second pass flue pipes 46 being circumferentially interdigitated with the third pass flue pipes 48. The third pass flue pipes 48 have upper ends sealingly communicated with the interior of the upper plenum 26, and lower ends sealingly communicated with the interior of the lower central flue pipe portion 42b above the bottom end wall 18 of the tank 12.

During firing of the water heater 10, combustion gases 38 discharged from the burner 40 sequentially flowing (1) downwardly through the upper central flue pipe portion 42a to the dividing structure 44, (2) upwardly through the second pass flue pipes 46 into the upper plenum 26, (3) downwardly from the upper plenum 28 through the third pass flue pipes 48 and into the lower plenum 28 via the bottom end portion 42b of the central flue pipe 42 beneath its internal dividing structure 44, and then (4) outwardly from the bottom plenum 28 via the vent pipe 30. Condensate may be appropriately drained from the bottom plenum 28 and/or the vent pipe 30.

Figure 6:
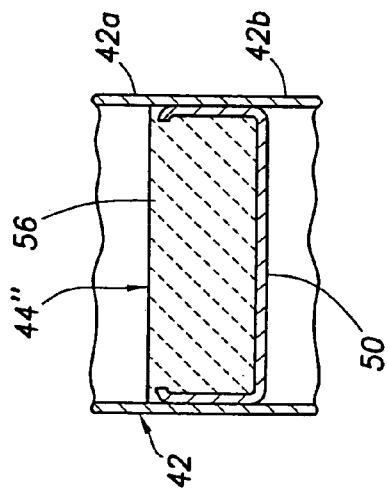
FIGS. 6-8 are enlarged scale cross-sectional detail views through a flue dividing structure illustrating alternate methods of installing it in a central flue portion of the water heater.

The dividing structure 44 may be installed within the central flue pipe 42 in a variety of manners. For example, as illustrated in FIG. 6 the dividing structure 44 may be formed from a cylindrical cup-shaped metal dividing member 50 which may be press-fitted, open side down, upwardly into the lower end of the central flue pipe 42 and then fixedly secured within its interior by welding the inserted dividing member 50 in place within the flue pipe 42 with an annular weld bead 52 extending along the periphery of the open bottom side of the dividing member 50.

Figure 7:
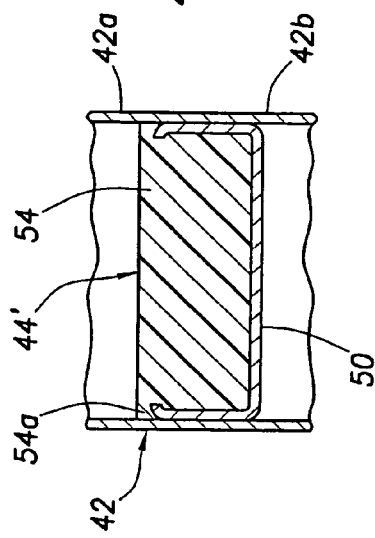

A first representative alternate embodiment 44' of the dividing structure 44 is illustrated in FIG. 7 and is formed by placing a high temperature-meltable sealing material 54 into the dividing member 50, upwardly press-fitting the dividing member 50, open side up, into the interior of the central flue pipe 42, and then suitably heating the sealing material 54 to melt it and cause it to form a seal area 54a around the upper annular periphery of the dividing member 50.

Figure 8:
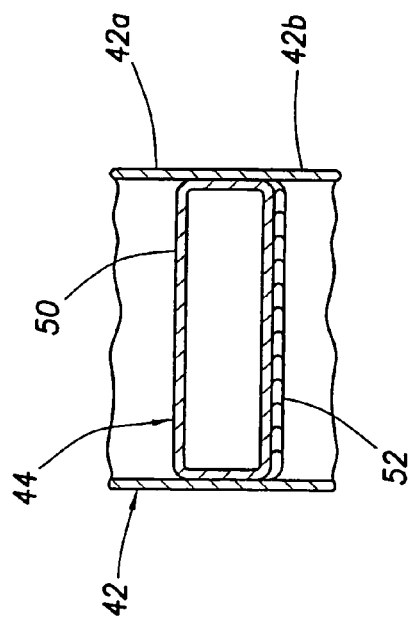
Figure 5:
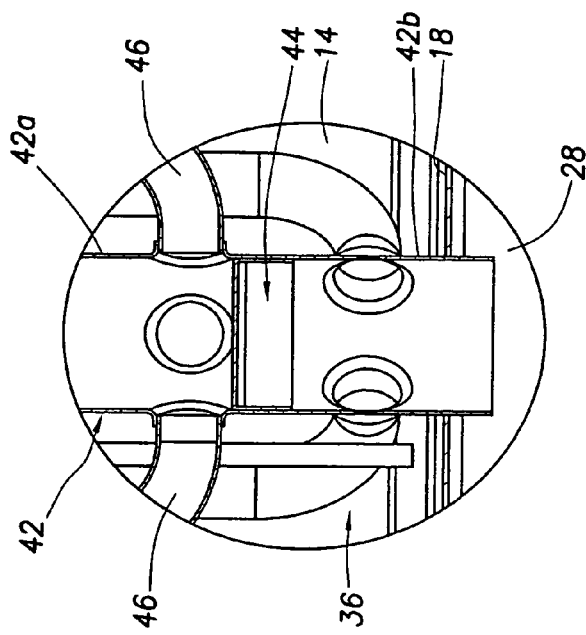
FIG. 5 is an enlarged scale detail view of the dashed area "5" in FIG. 2.

A second representative alternate embodiment 44" of the dividing structure 44 is illustrated in FIG. 8 and is formed by placing a ceramic refractory-type insulating material 56 within the interior of the dividing member 50 and then upwardly press-fitting the member 50, open side-up, into the interior of the central flue pipe 42.

In addition to providing the water heater 10 with a heating efficiency of at least 95%, the heat exchanger 36 is also relatively easy to fabricate and install within the water heater tank 12. Moreover, it can be seen that the heat exchanger penetrates the bottom tank wall 18 at only a single, central location. Accordingly, the bottom tank wall 18 may be of a lesser thickness than a bottom tank wall which must be penetrated by multiple flue pipes.

While the three-pass heat exchanger 36 has been representatively illustrated in a vertical, down-fired orientation, it will be readily appreciated by those of skill in this particular art that it could be alternatively positioned in an up-fired orientation within the tank 12, or in a horizontal orientation therein, without departing from principles of the present invention.

The foregoing detailed description is to be clearly understood as being given by way of illustration and example only, the spirit and scope of the present invention being limited solely by the appended claims.

What is claimed is:

1. A fuel-fired heating appliance comprising:
   a tank for holding water to be heated;
   first and second spaced apart plenum structures external to said tank;
   a heat exchanger disposed within said tank and including a tubular first pass member, a dividing structure separating said first pass member into a first longitudinal portion and a second longitudinal portion communicating with the interior of said second plenum structure, at least one tubular second pass member having a first end communicating with the interior of said first longitudinal portion of said first pass member and a second end communicating with the interior of said first plenum structure, and at least one tubular third pass member having a first end communicating with the interior of said first plenum structure and a second end communicating with the interior of said second longitudinal portion of said first pass member; and a combustion system operative to flow hot combustion gas sequentially through said first longitudinal portion of said first pass member and then into said first plenum structure via said at least one second pass member, from said first plenum structure into said second longitudinal portion of said first pass member via said at least one third pass member, and then into said second plenum structure from said second longitudinal portion of said first pass member.

2. The fuel-fired heating appliance of claim 1 wherein: said fuel-fired heating appliance is a water heater.

3. The fuel-fired heating appliance of claim 1 wherein: said first plenum structure is an upper plenum structure, said second plenum structure is a lower plenum structure, and said first, second and third pass members longitudinally extend generally vertically through the interior of said tank.

4. The fuel-fired heating appliance of claim 1 wherein: said combustion system includes a power burner operative to flow said hot combustion gas into said first longitudinal portion of said first pass member.

5. The fuel-fired heating appliance of claim 1 wherein: said at least one tubular second pass member is a plurality of tubular second pass members circumferentially spaced outwardly around said tubular first pass member in a parallel relationship therewith, and said at least one tubular third pass member is a plurality of tubular third pass members circumferentially spaced outwardly around said tubular first pass member in a parallel relationship therewith.

6. The fuel-fired heating appliance of claim 5 wherein: said second and third pass members are disposed in a generally circular array around said first pass member.

7. The fuel-fired heating appliance of claim 6 wherein: said first plenum structure has an annular configuration.

8. The fuel-fired heating appliance of claim 6 wherein: said second pass members are circumferentially interdigitated with said third pass members.

9. The fuel-fired heating appliance of claim 1 wherein: said dividing structure includes a dividing member press-fitted into the interior of said first pass member.

10. The fuel-fired heating appliance of claim 1 wherein: said dividing structure includes a generally cup-shaped dividing member disposed in the interior of said first pass member.

11. The fuel-fired heating appliance of claim 10 wherein: said dividing member has an open side facing said first longitudinal portion of said first pass member.

12. The fuel-fired heating appliance of claim 10 wherein: said dividing member has an open side facing said second longitudinal portion of said first pass member.

13. The fuel-fired heating appliance of claim 10 wherein: said dividing member has an open side peripheral edge welded to said first pass member.

14. The fuel-fired heating appliance of claim 10 wherein: said dividing member is filled with a melted sealing material.

15. The fuel-fired heating appliance of claim 10 wherein: said dividing member is filled with a rigid insulating material.

16. A fuel-fired water heater comprising:

a tank for holding water to be heated, said tank having upper and lower end walls;

an upper plenum structure positioned above said upper end wall;

a lower plenum structure positioned below said lower end wall;

a heat exchanger disposed within said tank, said heat exchanger including:

a vertical first pass flue pipe centrally extending through the interior of said tank between said upper and lower end walls, said first pass flue pipe having a dividing structure therein which separates it into upper and lower longitudinal portions, said first pass flue pipe further having a lower end communicated with the interior of said lower plenum structure;

a circumferentially spaced plurality of vertical second pass flue pipes outwardly circumscribing said first pass flue pipe and intercommunicating the interiors of said upper plenum structure and said upper longitudinal portion of said first pass flue pipe; and a circumferentially spaced plurality of vertical third pass flue pipes outwardly circumscribing said first pass flue pipe and intercommunicating the interiors of said upper plenum structure and said lower longitudinal portion of said first pass flue pipe; and a power burner operative to force hot combustion gas sequentially through said upper longitudinal portion of said first pass flue pipe, said second pass flue pipes, said upper plenum structure, said third pass flue pipes, said lower longitudinal portion of said first pass flue pipe, and then into said lower plenum structure.

17. The fuel-fired water heater of claim 16 wherein: said second and third pass flue pipes are in a generally circular array, and said upper plenum structure has an annular configuration.

18. The fuel-fired water heater of claim 17 wherein: said second pass flue pipes are circumferentially interdigitated with said third pass flue pipes.

19. The fuel-fired water heater of claim 16 wherein: only said first pass flue pipe penetrates said lower end wall of said tank.

20. The fuel-fired water heater of claim 16 further comprising:

a vent pipe through which flue gas entering said lower plenum structure may be discharged therefrom.

* * * * *